(12) United States Patent
Mueller-Hagedorn et al.

(10) Patent No.: US 9,561,483 B2
(45) Date of Patent: Feb. 7, 2017

(54) PROCESS AND REACTOR FOR PRODUCING SYNTHESIS GAS

(75) Inventors: Matthias Mueller-Hagedorn, Karlsruhe (DE); Katja Bartels, Frankfurt am Main (DE); Frederic Judas, Oberursel (DE)

(73) Assignees: L'AIR LIQUIDE Société Anonyme pour l'Etude et l'Exploitation des Procédés Georges Claude, Paris (FR); Lurgi GmbH, Frankfurt am Main (DE)

( * ) Notice: Subject to any disclaimer, the term of this patent is extended or adjusted under 35 U.S.C. 154(b) by 0 days.

(21) Appl. No.: 14/116,596

(22) PCT Filed: May 7, 2012

(86) PCT No.: PCT/EP2012/058404
§ 371 (c)(1),
(2), (4) Date: Nov. 8, 2013

(87) PCT Pub. No.: WO2012/152772
PCT Pub. Date: Nov. 15, 2012

(65) Prior Publication Data
US 2014/0070143 A1    Mar. 13, 2014

(30) Foreign Application Priority Data
May 10, 2011    (DE) .................. 10 2011 101 077

(51) Int. Cl.
*B01J 7/00*   (2006.01)
*C01B 3/36*   (2006.01)
(Continued)

(52) U.S. Cl.
CPC ...... *B01J 7/00* (2013.01); *B01J 4/002* (2013.01); *B01J 8/0278* (2013.01); *B01J 8/0285* (2013.01);
(Continued)

(58) Field of Classification Search
CPC ............. B01J 7/00; B01J 4/002; B01J 8/0278; B01J 2208/00504; B01J 8/0285; C01B 3/363; C01B 2203/025; C01B 2203/0244; C01B 3/382; C10J 2200/152; C10J 3/506
(Continued)

(56) References Cited

U.S. PATENT DOCUMENTS 277,379 A    5/1883   Thigpen
3,904,119 A *  9/1975  Watkins .................. 239/405
(Continued)

FOREIGN PATENT DOCUMENTS

AT    19789    5/1986
CA    2 653 443    1/2008
(Continued)

OTHER PUBLICATIONS

International Preliminary Report on Patentability, for PCT/EP2012/058404 mailed Nov. 12, 2013 and related to this application No. 14/116,596, 10 pages.
(Continued)

*Primary Examiner* — Stanley Silverman
*Assistant Examiner* — Syed Iqbal
(74) *Attorney, Agent, or Firm* — Pauly, Devries Smith & Deffner, LLC (57) ABSTRACT

For producing synthesis gas by autothermal reformation of gaseous, liquid and/or solid fuels, the fuel is reacted with an oxidizing agent in a reaction space at a pressure of 10 to 120 bar and a reaction space temperature of 800 to 2,000° C. to obtain synthesis gas, wherein the oxidizing agent is introduced centrally in the upper region of the reaction space and wherein a flame is formed in the reaction space. The oxidizing agent is introduced into the reaction space separate from the fuel.

15 Claims, 4 Drawing Sheets

(51) Int. Cl.
  *B01J 4/00* (2006.01)
  *B01J 8/02* (2006.01)
  *C01B 3/38* (2006.01)
  *C10J 3/50* (2006.01)

(52) U.S. Cl.
  CPC ............... *C01B 3/363* (2013.01); *C01B 3/382* (2013.01); *C10J 3/506* (2013.01); *B01J 2208/00504* (2013.01); *C01B 2203/025* (2013.01); *C01B 2203/0244* (2013.01); *C10J 2200/152* (2013.01)

(58) Field of Classification Search
  USPC .. 422/197, 196, 202, 158; 423/644; 252/373
  See application file for complete search history.

(56) References Cited

U.S. PATENT DOCUMENTS

| | | | |
|---|---|---|---|
| 3,972,690 A | | 8/1976 | van Os |
| 5,087,270 A | | 2/1992 | Gateau et al. |
| 5,292,246 A | | 3/1994 | Gateau et al. |
| 5,549,877 A | | 8/1996 | Gateau et al. |
| 6,143,202 A | * | 11/2000 | Christensen et al. ......... 252/373 |
| 6,692,661 B1 | | 2/2004 | Bedetti |
| 7,048,772 B1 | * | 5/2006 | Bedetti .................. C01B 3/363 |
| | | | 422/198 |
| 7,368,482 B2 | | 5/2008 | Basini et al. |
| 7,547,002 B2 | * | 6/2009 | Mao et al. .................... 261/78.1 |
| 2008/0141588 A1 | | 6/2008 | Kirchhubel et al. |
| 2011/0104623 A1 | * | 5/2011 | Zanichelli ......................... 431/9 |

FOREIGN PATENT DOCUMENTS

| | | | | |
|---|---|---|---|---|
| EP | 0 288 387 | | 10/1988 | |
| EP | 2 140 932 | | 1/2010 | |
| GB | 832385 | | 4/1960 | |
| GB | 1198189 | | 7/1970 | |
| GB | 1354073 | | 5/1974 | |
| GB | 2164951 | | 4/1986 | |
| IT | WO 2006128515 A1 | * | 12/2006 | ............. B01J 4/002 |
| WO | WO 2008064806 A1 | * | 6/2008 | |

OTHER PUBLICATIONS

PCT International Search Report for PCT/EP2012/058404 mailed Aug. 17, 2012, 3 pages.

* cited by examiner

Fig.5

PROCESS AND REACTOR FOR PRODUCING SYNTHESIS GAS

CROSS-REFERENCE TO RELATED APPLICATIONS

This application is a national stage application under 35 U.S.C. 317 of Inter-national Patent Application Serial No. PCT/EP2012/058404, entitled "Process and Reactor for Producing synthesis Gas," filed May 7, 2012, which claims priority from German Patent Application No. DE 10 2011 101 077, filed May 10, 2011, the disclosures of which are incorporated herein by reference.

FIELD OF THE INVENTION

This invention relates to a process and a reactor for producing synthesis gas by autothermal reformation, in which a fuel is reacted with an oxidizing agent in a reaction space at a pressure of 10 to 120 bar and a reaction space temperature of 800 to 2,000° C. to obtain synthesis gas, wherein the oxidizing agent is centrally introduced in the upper region of the reaction space, and wherein a flame is formed in the reaction space.

BACKGROUND

Synthesis gases are hydrogen-containing gas mixtures which are employed in various synthesis reactions. Examples include the methanol synthesis, the production of ammonia by the Haber-Bosch process or the Fischer-Tropsch synthesis.

A commonly used process for producing synthesis gases is the autothermal entrained-flow gasification of gaseous, liquid or solid fuels, as it is described for example in DE 10 2006 059 149 B4. At the head of a reactor, an ignition and pilot burner as well as rotationally symmetrically to the reactor axis three gasification burners are centrally arranged. Via the gasification burners, coal dust with oxygen and steam as gasification medium is supplied to a gasification space of the reactor, in which the fuel is converted to synthesis gas. Along with the liquid slag, the hot gasification gas leaves the gasification space and gets into a quenching space, into which water is injected for cooling raw gas and slag. The slag is deposited in the water bath and is discharged via a slag outlet. The quenched raw gas saturated with steam is withdrawn from the quenching space and cleaned in succeeding cleaning stages.

Since the fuel is directly reacted with the oxidizing agent, oxidizing agent and fuel must be supplied coaxially and coannularly.

U.S. Pat. No. 5,549,877 A1 also describes a process and an apparatus for producing synthesis gas, wherein an oxygen-containing oxidizing agent is centrally supplied at the reactor head and introduced into the reaction space along with fuel supplied annularly around the oxidant supply, in which reaction space the fuel initially is reacted substoichiometrically. There is formed a flame which advances downwards into the reaction space. In a recirculation zone, the materials present in the flame flow back to the top. Downstream via an annular conduit, an additional stream of oxidizing agent is supplied into the reaction zone, so that a flame zone expanded further is formed.

DE 10 2006 033 441 A1 describes a reformer for a fuel cell system, in which fuel is introduced into an oxidation zone through a centrally arranged fuel supply and in addition an oxidizing agent, in particular air, is introduced via oxidant supply means provided vertically thereto. Inside the oxidation zone, a reaction of fuel and oxidizing agent takes place by combustion. The product gas obtained then enters into a downstream mixing zone, in which fuel and oxidizing agent additionally are supplied by means of a secondary fuel supply means. The product gas mixed with the additional fuel enters into a reformation zone, in which it is converted into a gas mixture rich in hydrogen by an endothermal reaction, which gas mixture is withdrawn and provided to a fuel cell stack.

The arrangement of a burner in the head of a reactor, in which the oxidizing agent and the fuel are jointly supplied to the reactor, has the disadvantage that a strong flow is formed along the reactor axis. This flow is particularly large when liquid fuels are gasified. Due to the high relative velocity of fuel and atomizing medium still inside the burner or in the succeeding reaction space, the entry momenta of the media in direction of the reaction space axis are very high. The consequence is that the residence time along the reactor axis is very short, so that either a long reactor is required or the desired degree of conversion cannot be achieved. What is also disadvantageous is the larger diameter of the burner, which due to the large number of media outlets requires a large flange at the reactor. In addition, the coannular media arrangement frequently influences the mixing of the media in a disadvantageous way. In particular in the reformation of liquids, the spray cone of the liquid droplets can be constricted by the enveloping media with this arrangement.

To avoid the resulting unfavorable residence time distribution, the use of a plurality of burners therefore has been proposed already, whose flame zones partly overlap or deflect each other in the reaction space. As a result, the technical effort for the supply of media is increased, since each burner requires at least two inlets for fuel and oxidizing agent as well as possibly moderator and cooling water connections. For the exact regulation, an additional separate measuring and regulation technique also is required. Finally, the failure probability of the reactor increases corresponding to the number of burners.

SUMMARY

It is the object of the invention to provide for an efficient production of synthesis gas by avoiding the above-mentioned disadvantages.

In a process as mentioned above, this object substantially is solved with the invention in that the oxidizing agent is introduced into the reaction space separate from the fuel and converted there to synthesis gas (reformate).

In an oxidation zone inside the reactor, the oxidizing agent reacts with the gaseous reformate present therein. Thus, a direct reaction of the fuel with the oxidizing agent supplied does not occur.

In accordance with an aspect of the invention, the fuel is introduced at one or more points in a recirculation zone of the flame. The residence time of the fuel (reducing agent) in the reactor space thereby is increased, and a higher conversion is achieved with the same hydrodynamic residence time.

Due to the separate addition of oxidizing agent and fuel, the supply nozzles of these media can be designed and optimized independent of each other. For achieving a high conversion, a spatial utilization of the reaction space as large as possible is particularly advantageous. By the separate optimization of the fuel inlets, a reduction of the entry momentum of the fuel can be achieved. Due to the lower momentum of the fuel, solid and liquid fuel particles or droplets can easily be entrained by the flow in the recirculation zone. The oxidant inlet also can be designed such that an optimized flame is formed, which is not directly negatively influenced by the properties of the fuel. The efficiency of the process can be optimized thereby. The formation of by-products, such as soot, can be reduced.

During the conversion in the reaction space, the oxidizing agent in the oxidation zone reacts with the reformate generated in the reactor, which substantially constitutes a mixture of hydrogen and carbon monoxide, exothermally according to the following gross reaction equation:

$$H_2 + CO + O_2 \leftrightarrow H_2O + CO_2 \quad (1)$$

The resulting products water and carbon dioxide then can react with the supplied fuel and/or its thermal decomposition products to obtain reformate (synthesis gas). When methane is used as fuel, the following reactions are obtained:

$$CH_4 + CO_2 \leftrightarrow 2CO + 2H_2 \quad (2)$$

$$CH_4 + H_2O \leftrightarrow CO + 3H_2 \quad (3)$$

and for the thermal decomposition products of methane (carbon and hydrogen):

$$C + CO_2 \leftrightarrow 2CO \quad (4)$$

$$C + H_2O \leftrightarrow CO + H_2 \quad (5)$$

Other usable fuels react analogously. When the fuel substantially consists of carbon, the two equations (4) and (5) are relevant for the conversion.

The spatial separation of the individual reactions also provides for a simpler calculation of the reformation process. The conversion rate thus can be described much better. This also leads to an easier and more reliable optimization of the reaction space.

The reactions of the reformate with the oxidizing agent are extremely fast under these conditions, so that the flame starts directly at the entry opening of the oxidizing agent. To prevent an excessive temperature at the entry point, a moderator can be added to the oxidizing agent in accordance with the invention. Usually, steam or carbon dioxide are used for this purpose. Alternatively or in addition to the dosing of moderator to the oxidizing agent, an annular gap can be arranged around the supply of the oxidizing agent in accordance with the invention, through which gap the moderator directly flows into the reaction space. In this case, its task is to prevent that in direct vicinity of the outlet of the oxidizing agent a reaction with the reformate can start. Thus, the reaction front is shifted into the reaction space by a certain length, in general by a few centimeters. The unit of oxidant opening and moderator opening can actively be cooled in accordance with the invention. Even if only oxidant or a mixture of oxidant and moderator is supplied, a corresponding cooling can be provided.

By means of the arrangement according to the invention, a so-called inverse flame is generated, whose shape can be designed by the possibilities known to the skilled person. In accordance with a development of the invention, the oxidant is introduced into the reaction space with a swirl. In this way, the stability of the flame can be increased. The swirl also is suitable as parameter for adjusting the desired flame length, which also influences the reactor space geometry in terms of its length/diameter ratio. This offers the possibility of designing the reaction space relatively short, but wide.

As oxidizing agent, an oxygen-containing gas, in particular technically pure oxygen can be used, which in accordance with a development of the invention can be introduced into the reactor in a compressed and/or preheated condition.

In a development of the invention, the oxidizing agent moreover is introduced into the reaction space along with a moderator, for example steam, carbon dioxide or a mixture thereof, wherein the oxidizing agent also can be mixed with the moderator already outside the injection inlet.

When using oxygen or a mixture of oxygen with a moderator, the chemistry of the reaction with the reformate is largely known. Using available methods, the flame thus can be calculated in terms of its structure and stability. The spatial separation of the individual reactions likewise provides for a simpler calculation of the reaction process. For example, the conversion rate thus can be described in a better way. On this basis, the reaction space can be optimized easily and reliably.

Suitable fuels include gaseous or liquid hydrocarbons, carbonaceous solids or a mixture of a liquid and a solid (slurry). When liquid fuel is used, the same can be introduced into the reactor in atomized form, and in a development of the invention a moderator is used as atomizing medium.

In accordance with a development of the invention, the fuel is introduced into the reaction space via a plurality of inlets, wherein in one configuration different fuels are supplied through the individual fuel inlets. In this way, the reformation process can be influenced selectively.

The invention also relates to a reactor suitable for carrying out the above-mentioned process for producing synthesis gas in a reaction space with an inlet for fuel and an inlet for oxidizing agent, wherein the inlet for the oxidizing agent is provided centrally in the upper region of the reaction space, and with an outlet for the synthesis gas. In accordance with the invention, separate supply nozzles are provided for the oxidizing agent and the fuel into the reaction space.

In accordance with a development of this invention, a plurality of fuel supply nozzles can be arranged uniformly distributed around the circumference of the reaction space. In this way, symmetrical flow guidance can be achieved in the reactor.

It was found to be advantageous when the axes of the supply nozzles for the fuel intersect on the reaction space axis.

In an alternative embodiment, the axes of the supply nozzles for the fuel do not intersect on the reaction space axis, but merely in a plane which is vertical to the reaction space axis.

In accordance with the invention, the axes of the supply nozzles for the fuel are inclined at an angle of 1 to 180°, 10 to 30° or 120 to 140°, relative to the reaction space axis. At an angle >90°, the fuel substantially is introduced into the upward flow in the recirculation zone.

The exit velocity and direction of the fuel advantageously is such that the fuel is added to the recirculation zone of the flame as uniformly and widely as possible, in order to achieve a dwell time in the reactor as long as possible. In accordance with a development of the invention, it therefore is provided that when using liquid fuels a rather large spray angle in the range from 10 to 120°, 30 to 90°, or 45 to 75°, and in particular about 60°, is provided.

In particular in the case of gaseous feedstock, a catalyst bed can be present in the lower region of the reactor in accordance with the invention, in order to achieve a better degree of conversion at low gasification temperatures.

In an embodiment, the invention provides a process for producing synthesis gas by autothermal reformation of gaseous, liquid and/or solid fuels, in which the fuel is reacted with an oxidizing agent in a reaction space at a pressure of 10 to 120 bar and a reaction space temperature of 800 to 2,000° C. to obtain synthesis gas, wherein the oxidizing agent is introduced centrally in the upper region of the reaction space and wherein a flame is formed in the reaction space, wherein the oxidizing agent is introduced into the reaction space separate from the fuel.

In an embodiment, the fuel is introduced into a recirculation zone of the flame at one or more points.

In an embodiment, the oxidizing agent is introduced into the reaction space with a swirl.

In an embodiment, the oxidizing agent is introduced into the reaction space along with a moderator.

In an embodiment, the fuel is introduced into the reactor in atomized form.

In an embodiment, a moderator is used as atomizing medium.

In an embodiment, fuel is introduced into the reaction space via several inlets and that different fuels are supplied through the individual fuel inlets.

In an embodiment, A reactor for producing synthesis gas, in a reaction space with an inlet for fuel and an inlet for oxidizing agent, wherein the supply conduit for the oxidizing agent is provided centrally in the upper region of the reaction space, and with an outlet for the synthesis gas, wherein separate supply nozzles are provided for the oxidizing agent and the fuel into the reaction space.

In an embodiment, around the inlet for the oxidizing agent an annular gap is provided for supplying a moderator into the reaction space.

In an embodiment, a plurality of supply nozzles for the fuel are arranged uniformly distributed around the circumference of the reaction space.

In an embodiment, the axes ($B_i$) of the supply nozzles for the fuel intersect on the reaction space axis (R).

In an embodiment, the axes ($B_i$) of the supply nozzles for the fuel intersect in a plane which is vertical to the reaction space axis (R).

In an embodiment, the axes ($B_i$) of the supply nozzles for the fuel are inclined at an angle of 1 to 180° to the reaction space axis (R).

In an embodiment, the supply nozzles for the fuel include a spray angle of 10 to 120°.

In an embodiment, at least in the lower region of the reaction space a catalyst bed is provided.

BRIEF DESCRIPTION OF THE DRAWINGS

Further developments, advantages and possible applications of the invention can also be taken from the following description of exemplary embodiments and the drawing. All features described and/or illustrated form the subject-matter of the invention per se or in any combination, independent of their inclusion in the claims or their back-reference.

In the drawing:

FIG. 1b shows a top view of the reactor according to FIG. 1a, FIG. 2 shows a section through a second embodiment of the invention with lateral gas outlet.

DETAILED DESCRIPTION

By way of example, the succeeding detailed description of the present invention refers to the use of a liquid fuel such as oil or a vapor/oil mixture. The invention is, however, not limited thereto and can equally be applied for other suitable fuels.

Figure 1A:
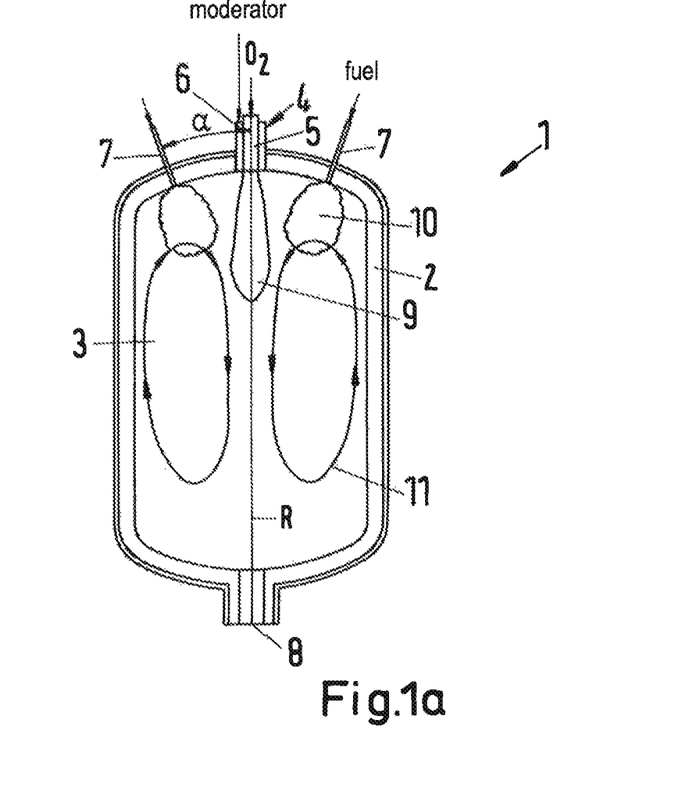
FIG. 1a schematically shows a section through a reactor of the invention according to a first embodiment with the representation of the oxidant and fuel injection as well as the recirculation zone of the flame.

The reactor 1 according to the invention for producing synthesis gas by partial oxidation and autothermal reformation includes a reaction space 3 surrounded by a reactor wall 2, in whose upper region (reactor head) a supply nozzle 4 for oxidizing agent is centrally provided in vertical direction. In the illustrated embodiment, a two-fluid nozzle is shown by way of example, in which the oxidizing agent, in particular technically pure, compressed and preheated oxygen, is supplied through an inner duct 5. A moderator, in particular steam, carbon dioxide or a mixture thereof, can be added to the oxidizing agent. Around the inner duct 5 an annular duct 6 is provided, through which a further part of the moderator is introduced into the reaction space 3. If necessary, the supply nozzle 4 for the oxidizing agent and the moderator can be cooled.

Figure 1B:
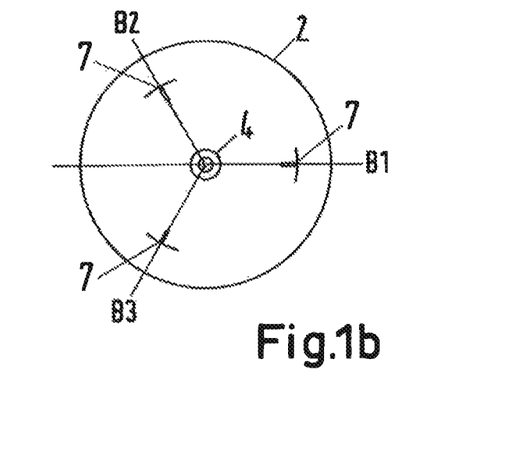

At an angle α of 10 to 30°, in particular about 20°, relative to the reactor space axis R three supply nozzles 7 for fuel are provided uniformly distributed around the circumference of the reactor 1. The axes $B_i$ of the supply nozzles 7 intersect on the reactor space axis R (cf. FIG. 1b). In the embodiment shown in FIG. 1, the supply nozzles 7 likewise are provided in the region of the reactor head, so that the fuel is introduced into the reaction space 3 from above. As liquid fuel, for example oils, suspensions of water or oil or of finely ground solids with a liquid (slurries) can be used. To the fuel to be reformed a part of the above-mentioned moderator can be added before the inlet to the reactor 1, in the inlet to the reactor 1, or via a separate concentric nozzle around the inlet. The exit velocity and direction of the fuel and possibly of the moderator can be chosen such that the fuel is added to the recirculation zone of the flame 9 as uniformly and widely as possible, in order to achieve a residence time in the reactor 1 as long as possible.

The liquid fuels are atomized by means of a spray nozzle which has a rather large spray angle of 10 to 120°. The atomization can be effected by pressure atomization or by means of a two-fluid nozzle, wherein the moderator can be used as atomizing medium. Such atomizer is disclosed for example in EP 1 016 705 B1 for use in a burner. Beside liquid fuels, the use of gaseous or solid fuels also is conceivable, in which the atomization then can be omitted. To avoid overheating, the supply nozzles 7 can be cooled actively.

In the bottom region of the reactor 1, an outlet 8 for withdrawing the synthesis gas (reformate) is centrally provided. Such configuration of the gas outlet is typical when the gas is supplied to a succeeding quenching nozzle (not shown) and in addition liquid slag possibly must also be discharged from the reactor.

In dependence on the feedstock, the reaction space 3 can be designed differently. In essence, it is a cylindrical hollow space which includes a refractory lining or in particular in use of strongly ash-containing fuels is defined by a cooling screen, along which the liquid slag can flow off.

In particular in the case of gaseous feedstock, a non-illustrated catalyst bed can be provided in the lower region of the reactor 1, in order to achieve a better degree of conversion at low gasification temperatures.

When introducing the oxidizing agent through the supply nozzle 4, the same reacts with the reformate generated in the reactor 1 by forming a flame 9. Through the inlet of the oxidizing agent and due to the reaction with the reformate, a flow with the recirculation zones 11 is formed in the reaction space 3. Along with a moderator, in particular steam or carbon dioxide, the fuel is introduced into the reactor 1 via the supply nozzle 7 such that the spray cone with the main evaporation zone 10 lies in the recirculation zone 11. In this way, the residence time of the fuel (reducing agent) in the reaction space 3 can be influenced positively. With the same hydrodynamic residence time, a higher conversion is achieved.

The height of the inlet for the fuel and the angle to the reactor axis R substantially can be chosen freely. It must be ensured, however, that the oxidation zone (flame) and the main evaporation zone are accommodated in different spatial regions in the reactor 1.

In dependence on the configuration of the reaction space, commissioning or starting the reactor 1 is effected differently. A refractory lined reactor usually is heated with a heat-up burner to such an extent that the masonry can provide a sufficient ignition energy. Before the oxygen is added to the reaction space 3, a sufficient amount of combustible gas must already be present in the reaction space 3. This can be achieved in that synthesis gas or hydrogen are supplied. Moreover, the energy of the hot walls initially can be utilized for the reformation of the fuel, so as to provide a reformate which reacts with the oxidizing agent. If the walls of the reaction space 3 are cooled, however, the ignition energy must be provided in some other way, for example by means of a heat-up burner which frequently remains in the reactor 1 after the start of the main reforming reactions.

Figure 2:
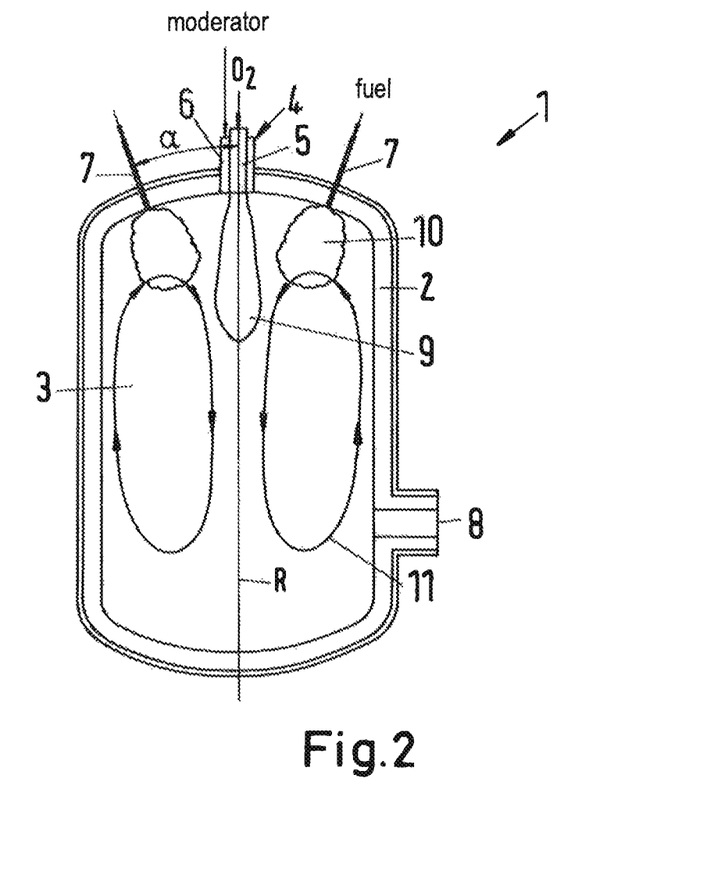

FIG. 2 shows a second embodiment of the invention, in which the outlet 8 for the synthesis gas is arranged laterally at the reactor 1. Such configuration is common practice in use of a non-illustrated waste heat boiler. Moreover, this embodiment corresponds to the reactor 1 according to the first embodiment.

Figure 3A:
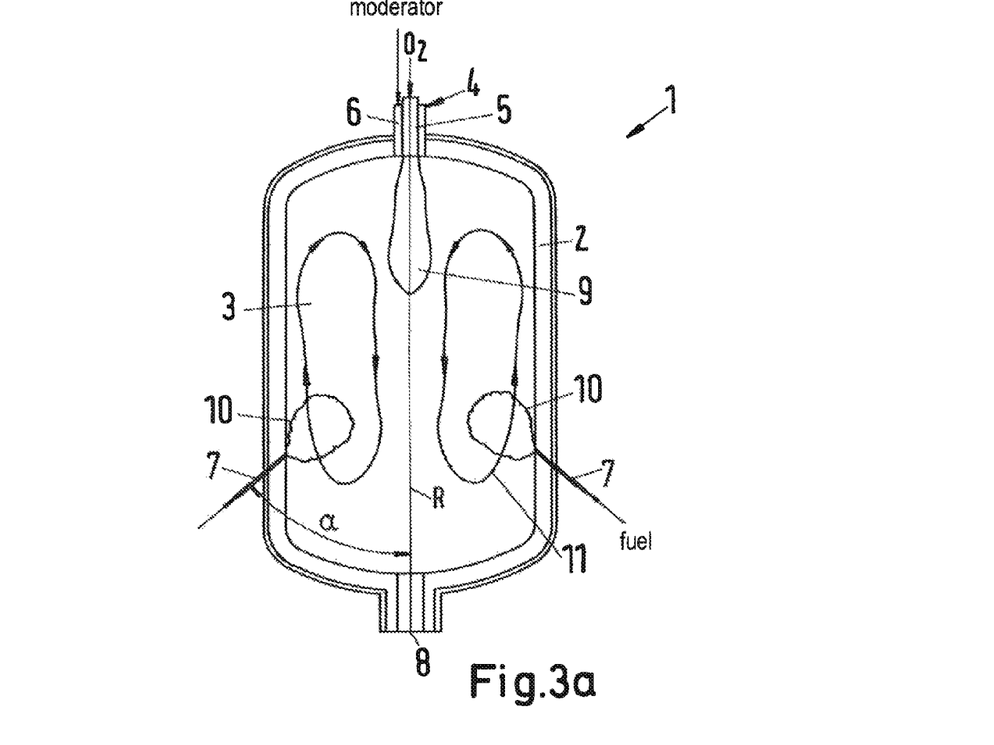
FIG. 3a shows a section through a reactor according to a third embodiment with fuel supply nozzles arranged in the lower region of the reactor.

FIG. 3 shows a further embodiment of the invention, in which in contrast to the embodiment of FIG. 1 the supply nozzles 7 for the fuel are arranged in the lower region of the reactor 1, and therefore the angle α is >90°, in particular about 135°. In this embodiment, the fuel is introduced into the recirculation zone 11 such that it substantially enters into the upward flow.

Figure 3B:
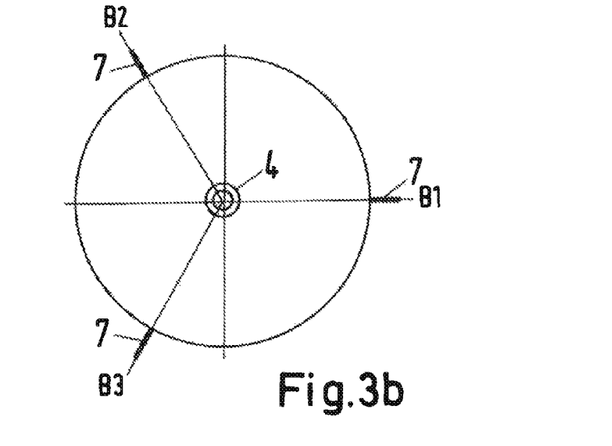
FIG. 3b shows a top view of the reactor according to FIG. 3a, FIG. 4 shows a section through a reactor according to a fourth embodiment, wherein the fuel supply nozzles are oriented differently.

FIG. 3b shows the projection of the supply nozzles 7 for the fuel on one plane. Like in the first embodiment, the fuel nozzle axes $B_i$ intersect in a point which lies on the reactor space axis R.

Figure 4:
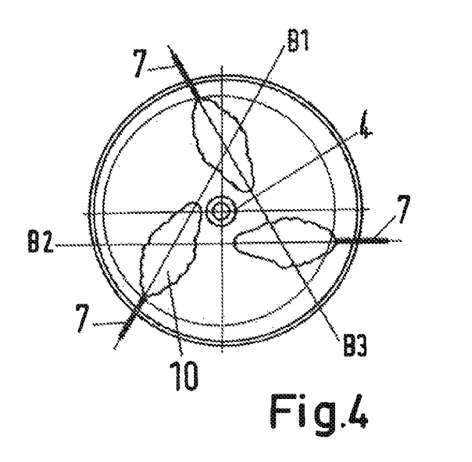

It is, however, not necessary that the axes $B_i$ intersect in one point. In the embodiment of FIG. 4 a projection of a case is shown, in which the fuel inlets 7 all lie on a common plane vertical to the reactor space axis R. The angles α each have the same value. However, the axes $B_i$ do not intersect in a common point. The points of intersection of the axes $B_i$ however, lie in one plane which is oriented vertical to the reactor space axis R. With this arrangement of the fuel inlets, a slight swirl can be generated in the reactor 1, which positively influences the residence time of the fuel in the reactor 1.

Figure 5:
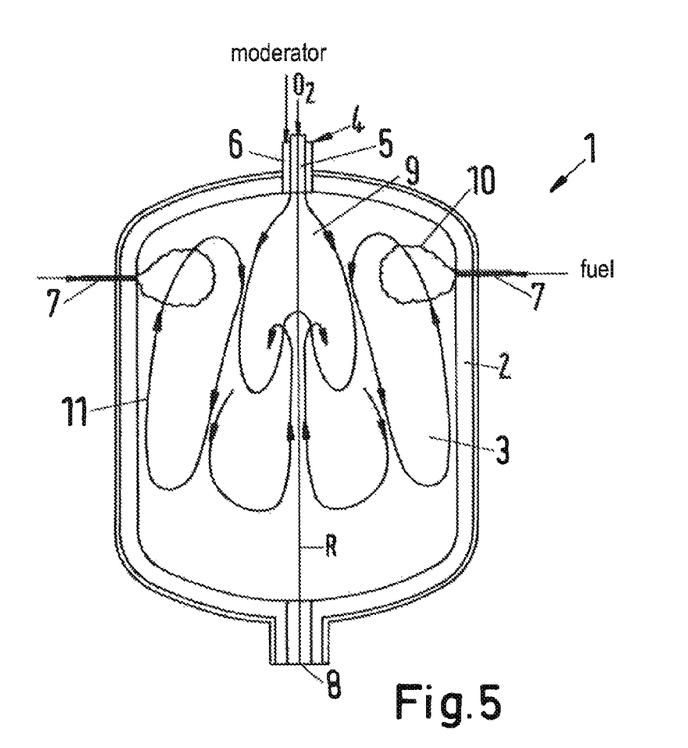
FIG. 5 shows a reactor according to the invention with another diameter/length ratio.

In the embodiment of FIG. 5 a large diameter/length ratio of the reaction space 3 is shown as compared to the embodiments of FIGS. 1 to 4. The oxidant inlet here has a large swirl number, so that the flame 9 becomes very short. The fuel is supplied via supply nozzles 7, which lie in a plane vertical to the reactor space axis R.

With the invention, an optimum residence time of the fuel in the reaction space 3 is achieved by the separate addition of oxidizing agent and reducing agent. With the same hydrodynamic residence time, a higher conversion is obtained. The supply nozzles 4, 7 for the oxidizing agent and the fuel, respectively, are designed and optimized independent of each other, so that no compromises must be made. Due to the achieved great spatial utilization of the reaction space, a very high conversion can be achieved. The efficiency of the process can be optimized and the generation of by-products such as soot can be reduced.

LIST OF REFERENCE NUMERALS 1 reactor
2 reactor wall
3 reaction space
4 supply nozzle for oxidizing agent
5 inner duct
6 annular duct
7 supply nozzle for fuel
8 outlet
9 flame
10 spray cone with main evaporation zone
11 recirculation zone
$B_i$ fuel nozzle axes
R reactor space axis

The invention claimed is:

1. A process for producing synthesis gas by autothermal reformation of gaseous, liquid and/or solid fuels, in which the fuel is reacted with an oxidizing agent in a reaction space at a pressure of 10 to 120 bar and a reaction space temperature of 800 to 2,000° C. to obtain synthesis gas, wherein the oxidizing agent is introduced centrally in the upper region of the reaction space and wherein a flame is formed in the reaction space, wherein the oxidizing agent is introduced into the reaction space separate from the fuel, wherein the fuel is introduced at one or more points into a recirculation zone of the flame, wherein the recirculation zone is defined as the zone wherein the materials present in the flame flow back to the top, and
   wherein the fuel is introduced into the recirculation zone along with a moderator such that a spray cone is formed within the recirculation zone.

2. The process according to claim 1, wherein the fuel is introduced into the recirculation zone of the flame at more than one point.

3. The process according to claim 1, wherein the oxidizing agent is introduced into the reaction space with a swirl.

4. The process according to claim 1, wherein the oxidizing agent is introduced into the reaction space along with a moderator.

5. The process according to claim 1, wherein the fuel is introduced into the reactor in atomized form.

6. The process according to claim 5, wherein a moderator is used as atomizing medium.

7. The process according to claim 1, wherein fuel is introduced into the reaction space via several inlets and that different fuels are supplied through the individual fuel inlets.

8. A reactor for producing synthesis gas in a reaction space with an inlet for fuel and an inlet for oxidizing agent, wherein the supply conduit for the oxidizing agent is provided centrally in the upper region of the reaction space, and with an outlet for the synthesis gas, wherein separate supply nozzles are provided for the oxidizing agent and the fuel into the reaction space such that the fuel is introduced at one or more points into a recirculation zone of the flame, wherein the recirculation zone is defined as the zone wherein the materials present in the flame flow back to the top, wherein the fuel is introduced into the recirculation zone along with a moderator via the fuel supply nozzles, such that a spray cone is formed within the recirculation zone.

9. The reactor according to claim 8, wherein around the inlet for the oxidizing agent an annular gap is provided for supplying a moderator into the reaction space.

10. The reactor according to claim 8, wherein a plurality of supply nozzles for the fuel are arranged uniformly distributed around the circumference of the reaction space.

11. The reactor according to claim 10, wherein the axes ($B_i$) of the supply nozzles for the fuel intersect on the reaction space axis (R).

12. The reactor according to claim 10, wherein the axes ($B_i$) of the supply nozzles for the fuel intersect in a plane which is vertical to the reaction space axis (R).

13. The reactor according to claim 10, wherein the axes ($B_i$) of the supply nozzles for the fuel are inclined at an angle of 1 to 180° to the reaction space axis (R).

14. The reactor according to claim 8, wherein the supply nozzles for the fuel include a spray angle of 10 to 120°.

15. The reactor according to claim 8, wherein at least in the lower region of the reaction space a catalyst bed is provided.

* * * * *